UNITED STATES PATENT OFFICE.

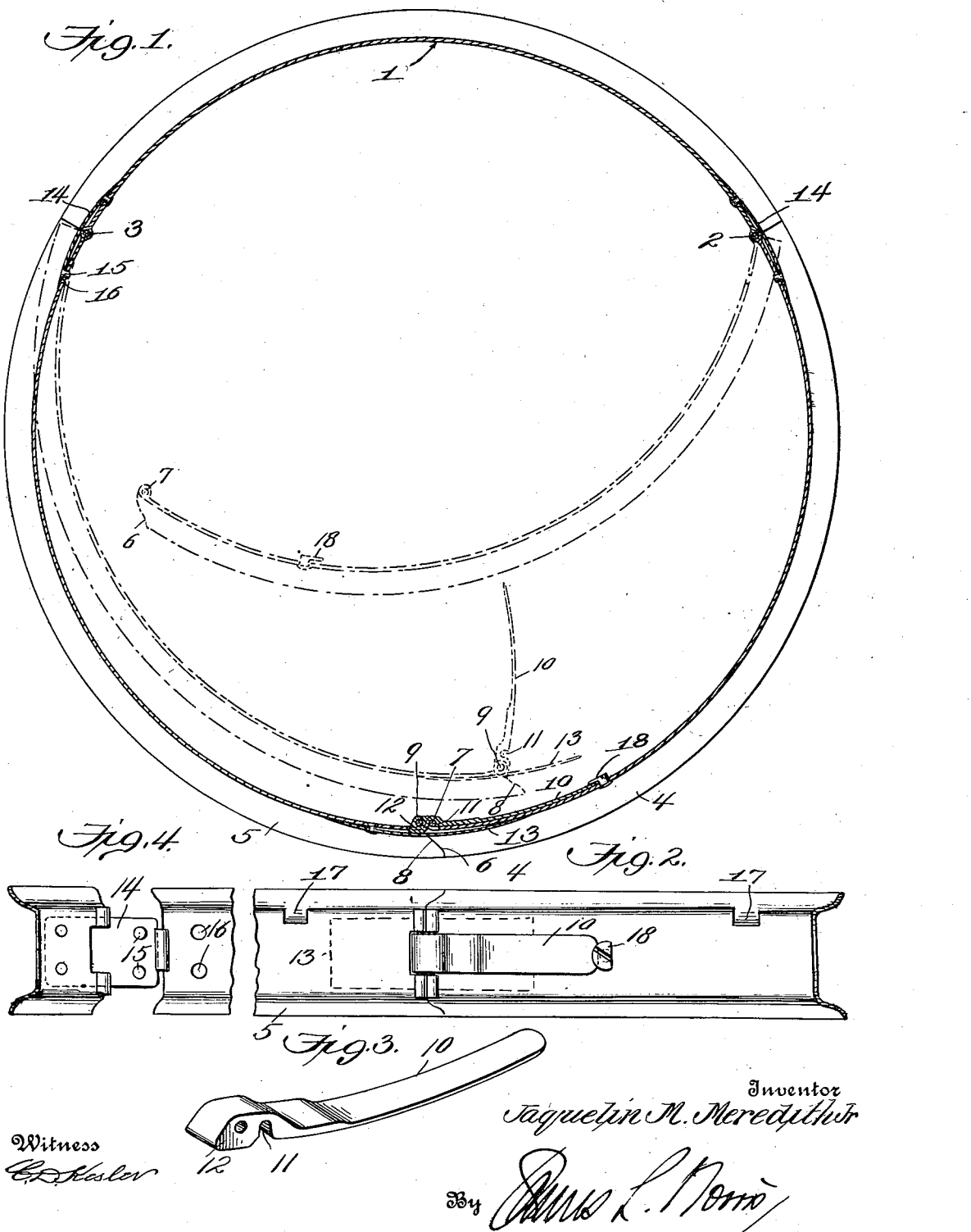

JAQUELIN M. MEREDITH, JR., OF NORFOLK, VIRGINIA.

WHEEL RIM.

1,415,670.     Specification of Letters Patent.     Patented May 9, 1922.

Application filed April 29, 1920. Serial No. 377,520.

*To all whom it may concern:*

Be it known that I, JAQUELIN M. MEREDITH, Jr., a citizen of the United States, residing at Norfolk, in the county of Norfolk and State of Virginia, have invented new and useful Improvements in Wheel Rims, of which the following is a specification.

This invention relates to collapsible rims for vehicle tires and particularly to the type of rim forming the subject-matter of my pending application for patent filed March 15, 1919, Serial No. 365,927.

The primary object of the present invention is to provide a collapsible rim which may be readily distended and adapted for use with large size tires that may be easily placed in position and securely seated in operative association with the rim without the use of any special tools or apparatus, or the exercise of any mechanical skill or knowledge. A further object of the invention is to provide a rim of the character specified for effectually setting the largest size of tires with minimum effort, the rim being so constructed that it will not damage or injure the tire and capable of holding the latter in a positive braced position against transverse stresses or strains.

With the above and other objects in view, my invention consists in certain features of structure, combination and relation which will be more fully set forth hereinafter.

I have illustrated one embodiment of my invention in the accompanying drawings, wherein:

Figure 1 is a vertical section through a rim constructed in accordance with my invention.

Figure 2 is an under side plan view of a portion of the rim showing the locking means.

Figure 3 is a perspective view of the locking lever.

Figure 4 is an under side plan view of a portion of the rim showing the parts of the hinged joint disconnected.

Referring to the drawings, wherein similar numerals denote like parts throughout the several views:

I provide a rim 1 which consists of a plurality of rim sections or segments, three being shown in the embodiment illustrated. These sections are hinged, as indicated at 2 and 3, thereby forming an annulus having the relatively free and movable segment members 4 and 5. I have shown the rim as being channeled but it is to be understood that the invention does not reside in that feature and that other types of rims may be used.

The segment member 4 is formed with a beveled end face, as at 6, and is provided on its inner side with a transversely disposed fixed staple or pin 7 having the greater portion thereof projecting inwardly clear of the said segment member 4. The segment member 5 is formed with a beveled face, as indicated at 8, so as to make a tight joint with the beveled end of segment 4. The member 5 carries, adjacent its free end, a transversely disposed pivoted pin 9 on which is mounted a locking lever or hasp 10. This locking lever or hasp is formed with a transversely extending recess 11 in its under face, this recess being adapted to take over and partially surround pin or staple 7. The lever 10 is further provided with a beveled head portion 12 below its pivot 9, the function of this head portion being to engage pin 7 when the lever is raised, thereby to project the segment member 4 of the rim inwardly.

The recess 11 has the function of exerting a frictional temporary binding action on the pin or staple 7, and when the lever 10 is moved inwardly to release the segments, and particularly the segment member 4 relatively to the adjacent segment member 5, the pin or staple 7 is crowded over to the left wall of the said recess 11 and thereby temporary retention of the pin or staple in the recess with sufficient stress to draw the adjacent extremity of the segment member 4 inwardly is obtained, and by such means the starting of the release or collapse of the segment 4 relatively to the segment 5 is accomplished.

A shield member 13 which is preferably in the form of a curved plate, as indicated in Figure 1 and in dotted lines in Figure 2, is riveted or otherwise secured at one end to the rim segment 5, the function of this plate being to prevent the head of the lever 10 from making contact with the tire when the lever is actuated.

In order to prevent the rim from being sprung outwardly beyond its normal limits and to prevent any undue transverse stresses on the hinge members 3, I provide each of these hinge joints with a shield member, as indicated at 14. These shield members consist of plates of suitable material curved to conform to the periphery of the rim and which are riveted or otherwise secured at one end to one of the segment members. The free ends of each of these shield members carry inwardly projecting studs 15 preferably associated in pairs, as indicated in Figure 4, and when the rim is in distended position these studs project into suitable apertures 16 provided in the bed of the rim channel.

The rim is further provided with a plurality of recesses 17 in its under face. These recesses are adapted to receive the usual wedge members of the wheel (not shown).

In order to lock the rim in distended position, I provide a button 18 which is adapted to take over the free end of lever 10 and secure the same to the inner face of the rim segment 4.

In the operation of my device, when it is desired to collapse the rim from the position illustrated in Figure 1, the button is turned to release the lever 10, the lever is pulled inwardly, whereupon the head 12 will act upon pin 7 to force the segment 4 inwardly relative to the other members of the rim, as indicated in dotted lines in Figure 1. From this position the rim may be further collapsed as desired and the tire readily removed. In order to place a tire on the rim starting from the collapsed position of the rim, the rim segment 4 is swung outwardly until the pin 7 bears upon the under side of lever 10, whereupon, when lever 10 is forced outwardly the pin or staple 7 will ride down the lever until it springs into the transverse recess 11. The button 18 is then, of course, turned to secure the lever in its position on the under face of segment 4.

It is apparent that in the operation of this device a tire may be effectually mounted upon the rim within the space of a very short time and that the shield members 14 will act to prevent any outward springing of the rim beyond its normal distended position, protect the tire from any undue wear and at the same time will prevent any transverse stresses upon the hinge connections.

Having described my invention, I claim—

1. In a device of the class specified, a transversely split rim provided with a plurality of segments comprising two relatively free and movable segments, a transversely disposed fixed pin mounted adjacent to the end of one of said movable segments and having the greater portion thereof projecting inwardly clear of the segment on which it is mounted, and a locking lever carried by the remaining movable segment end adjacent to said pin, the locking lever having an enlarged cam end eccentrically connected to its segment and also provided with a recess in rear of the said cam end to receive and exert a frictional stress on the fixed pin of the other segment and operating to draw the movable segments into alinement and also to distend the latter and separate and collapse the segments.

2. In a collapsible rim, a rim section having a pair of sections hinged at one end thereto, the remaining ends of the pair of sections being relatively free and movable and having their ends which are attached to the first named section formed with apertures, a pair of shield plates fixed to the first named section adjacent to the opposite ends thereof, said shield plates being formed to project beyond the ends of the section to which they are attached and to overlie the inner faces of the ends of the next adjacent sections, the shield plates also being provided on their free ends with lugs to enter the apertures in the ends of the said pair of rim sections, and means for detachably connecting the relatively free ends of the pair of rim sections.

3. A collapsible rim of the class specified, having a plurality of segments with hinged connections between the ends whereby an annular structure having two relatively free and movable segment extremities is provided, a fixed catch member extending transversely over the inner side of the end of one of the movable segments, and a latching lever pivotally mounted on the adjacent end of the remaining movable segment and having an enlarged end with a cam face and a recess in rear of the enlarged end extending thereacross and opening through one side to removably engage over and receive and exert a frictional stress on the said fixed catch member, the enlarged end of the lever being eccentrically connected to the end of the segment to which it is applied, the cam face of the lever being inwardly located and free to bear upon the surface of the segment to which it is attached, the cam lever being operable to draw and also separate and collapse the movable segments by the conjoint action of the temporary frictional binding between the catch member and the walls of the recess and the cam face.

4. A collapsible wheel rim having a plurality of segments with hinge connections between portions thereof whereby an annular structure having two relatively free and movable segment ends is provided, a catch member extending transversely over the inner side of the end of one of the movable segments, and a latching lever pivotally mounted on the adjacent end of the remaining movable segment and having a recess extending transversely thereacross and opening through one side to engage the catch member and also formed with a cam portion to bear upon the segment adjacent thereto, the recess and cam portion of the lever being on opposite sides of the pivot of said lever, a frictional stress being exerted on the catch member by the walls of the recess and whereby the lever is operable to draw the movable segments into alinement and also to separate and collapse said segments.

5. In a collapsible wheel rim, a plurality of rim sections, hinge connections between said sections whereby an annular structure having two relatively free and movable ends is provided, a latching lever mounted on one of said free ends, means for securing said latching lever on the other of said free ends, shield members affixed at one end to the outer face of one of said rim sections and adapted to overlie said hinge connections when the rim is distended, two of said rim sections being provided with a pair of apertures adjacent their hinged connections to the next rim section, and a pair of lugs on each of said shield members so positioned as to enter the apertures in the rim section when the rim is distended.

6. In a collapsible wheel rim, a plurality of rim sections, hinge connections between said sections whereby an annular structure having two relatively free and movable ends is provided, a latching lever mounted on one of said free ends, shield members affixed at one end to the outer face of one of said rim sections and adapted to overlie said hinge connections when the rim is distended, two of said rim sections being provided with a pair of apertures adjacent their hinged connections to the next rim section, and a pair of lugs on each of said shield members so positioned as to enter the apertures in the rim section when the rim is distended.

In testimony whereof I have hereunto set my hand.

JAQUELIN M. MEREDITH, Jr.